United States Patent [19]
Heimann et al.

[11] Patent Number: 5,730,176
[45] Date of Patent: Mar. 24, 1998

[54] SINGLE-CONTROL MIXING VALVE WITH PIVOTAL CASING

[75] Inventors: Bruno Heimann, Fröndenberg; Bernd Bischoff, Hemer; Kerstin Keiter, Menden, all of Germany

[73] Assignee: Friedrich Grohe AG, Hemer, Germany

[21] Appl. No.: 618,866

[22] Filed: Mar. 20, 1996

[30] Foreign Application Priority Data

Mar. 24, 1995 [DE] Germany ............... 195 10 906.6

[51] Int. Cl.⁶ .................. F16K 11/074; F16L 5/00
[52] U.S. Cl. .............. 137/35; 137/625.17; 137/636.3
[58] Field of Search ............... 137/359, 625.17, 137/625.4, 636.2, 636.3

[56] References Cited

U.S. PATENT DOCUMENTS

| | | | |
|---|---|---|---|
| 2,708,449 | 5/1955 | Keithley | 137/359 |
| 3,807,453 | 4/1974 | Dom et al. | 137/359 X |
| 4,535,814 | 8/1985 | Pawelzik et al. | 137/625.17 |
| 4,610,272 | 9/1986 | Gottwald | 137/625.17 |
| 4,651,774 | 3/1987 | Oberdorfer | 137/625.17 |
| 4,657,045 | 4/1987 | Kitamura | 137/625.17 X |
| 4,887,642 | 12/1989 | Bernat | 137/625.17 X |

FOREIGN PATENT DOCUMENTS 0 195 999   10/1986   European Pat. Off.
2 470 319   11/1979   France .
31 03 891    9/1982   Germany .

Primary Examiner—John Rivell
Attorney, Agent, or Firm—Herbert Dubno; Andrew Wilford

[57] ABSTRACT

A mixing valve has a housing, a valve cartridge fixed in the housing and having valve elements movable to vary rate and temperature of flow through the cartridge, and a handle connected to the valve elements and movable through a predetermined angular displacement about a temperature-adjustment axis to vary the temperature of flow through the cartridge and a flow-adjustment axis orthogonal to the temperature-adjustment axis to vary the rate of flow through the cartridge. A sleeve-like casing surrounding the cartridge is rotatable on the housing about one of the axes and is traversed by the handle. Interengaging formations on the casing and on the housing axially retain the casing on the housing except in a predetermined angular position of the casing on the housing relative to the one axis. The predetermined angular position corresponds to an orientation of the casing on the housing outside any position assumed by the casing during pivoting of the handle through the predetermined angular displacement about the one axis. Thus the casing can be installed on the housing in the predetermined angular position and then rotated out of the predetermined angular position to lock it axially on the housing.

15 Claims, 4 Drawing Sheets

SINGLE-CONTROL MIXING VALVE WITH PIVOTAL CASING

FIELD OF THE INVENTION

The present invention relates to a mixing-valve. More particularly this invention concerns a single-control mixing valve normally provided with a faucet.

BACKGROUND OF THE INVENTION

A standard faucet-type mixing valve has a housing that holds a cartridge. Hot- and cold-water feed conduits are connected to the housing as well as a mixed-water output conduit. Valve elements in the cartridge can be moved by a handle to vary the rate of flow from the feed conduits to the outlet conduit as well as the ratio of mix of hot and cold water, thereby varying the temperature of the outputted flow. Typically such an assembly is controlled by a single handle which can be swiveled about a central axis of the valve to vary the temperature and that can be tipped about an orthogonal axis to vary the flow rate.

As described in commonly owned U.S. Pat. No. 4,610,272 of Gottwald the handle has an arcuate portion with a center of curvature on the axis and that passes snugly through a window in a casing covering the cartridge. Thus as the handle is pivoted about the temperature-adjustment axis the entire casing follows its movements and when it is pivoted about the flow-control axis the casing is stationary.

The valve has a stationary housing formed with an upwardly extending threaded collar over which an inwardly projecting ridge of the casing is fitted. Then an internally threaded ring is screwed down on the collar to axially fix the casing in place, the handle is mounted in position, and a separate cap is snap fitted on the end of the casing. This assembly is relatively complex and requires that the casing be made in several different parts.

OBJECTS OF THE INVENTION

It is therefore an object of the present invention to provide an improved mixing-valve assembly.

Another object is the provision of such an improved mixing-valve assembly which overcomes the above-given disadvantages, that is which is of simpler construction and that is easier to assemble.

SUMMARY OF THE INVENTION

A mixing valve has according to the invention a housing, a valve cartridge fixed in the housing and having valve elements movable to vary rate and temperature of flow through the cartridge, and a handle connected to the valve elements and movable through a predetermined angular displacement about a temperature-adjustment axis to vary the temperature of flow through the cartridge and a flow-adjustment axis orthogonal to the temperature-adjustment axis to vary the rate of flow through the cartridge. A sleeve-like casing surrounding the cartridge is rotatable on the housing about one of the axes and is traversed by the handle. In accordance with the invention interengaging formations on the casing and on the housing axially retain the casing on the housing except in a predetermined angular position of the casing on the housing relative to the one axis. The predetermined angular position corresponds to an orientation of the casing on the housing outside any position assumed by the casing during pivoting of the handle through the predetermined angular displacement about the one axis.

Thus according to the invention the casing can be installed on the housing in the predetermined angular position and then rotated out of the predetermined angular position to lock it axially on the housing. Normally the handle only moves through about 90° from the full-hot to full-cold position, so that as long as the installation position lies outside this range, the casing will remain axially locked on the housing so long as the lever is installed. The casing can therefore be made of a single piece, typically of a decorative synthetic resin which may be given a decorative coating or plating.

According to the invention the formations include radially outwardly projecting nonequiangularly spaced projections on the housing and radially inwardly projecting ridges defining gaps complementary to and angularly spaced like the projections so that when axially aligned the projections can pass through the gaps. The casing is formed with a radially throughgoing window through which the handle extends. More particularly the cartridge is provided with a radially directed mount for the handle and the window is so positioned that, when the projections are axially aligned with the respective gaps the window is offset relative to the one axis. The mount is offset relative to the one axis by about 180° to the window.

The housing according to the invention includes a collar formed with the projections. More specifically the housing is formed with a seat receiving the collar and centered on the one axis. The seat and collar are formed with a radially interengaging ridge and groove that rotationally link the collar and housing against rotation about the one axis. The collar is formed with radially deflectable tabs engaging in the seat and retaining the collar therein against axial movement. The seat is formed with a groove in which the tabs engage and the tabs and groove have chamfered edges. The collar and housing have annular surfaces that flatly engage each other when the collar is fitted to the seat. To prevent the valve assembly from coming apart after the cartridge has been installed the cartridge has a cylindrical outer surface engaging inner surfaces of the tabs and preventing inward deflection of same when the cartridge is in the collar. Similarly the collar is formed with radially inwardly deflectable tongues carrying the projections. In practice the collar has three such projections and the projections are formed of a low-friction material and are rounded.

In accordance with this invention the window and the handle each have a dimension measured transversely of the one axis that are roughly equal to each other so that the handle entrains the casing when pivoted about the one axis. On the other hand the handle has a dimension measured parallel to the one axis and the window has a correspondingly measured dimension that is much greater so that when pivoted about the other axis the casing is not entrained. The handle carries a skirt that covers the window in all positions. In addition the housing and casing have adjacent indicia indicating relative positions and a seal ring is provided between the housing and casing. A hold-down ring and screws clamp the cartridge onto the housing. The cartridge is formed with external guides for the casing. More-over the casing is of one piece and is cup-shaped with a domed closed end.

BRIEF DESCRIPTION OF THE DRAWINGS

The above and other objects, features, and advantages will become more readily apparent from the following description, reference being made to the accompanying drawing in which.

SPECIFIC DESCRIPTION

Figure 1:
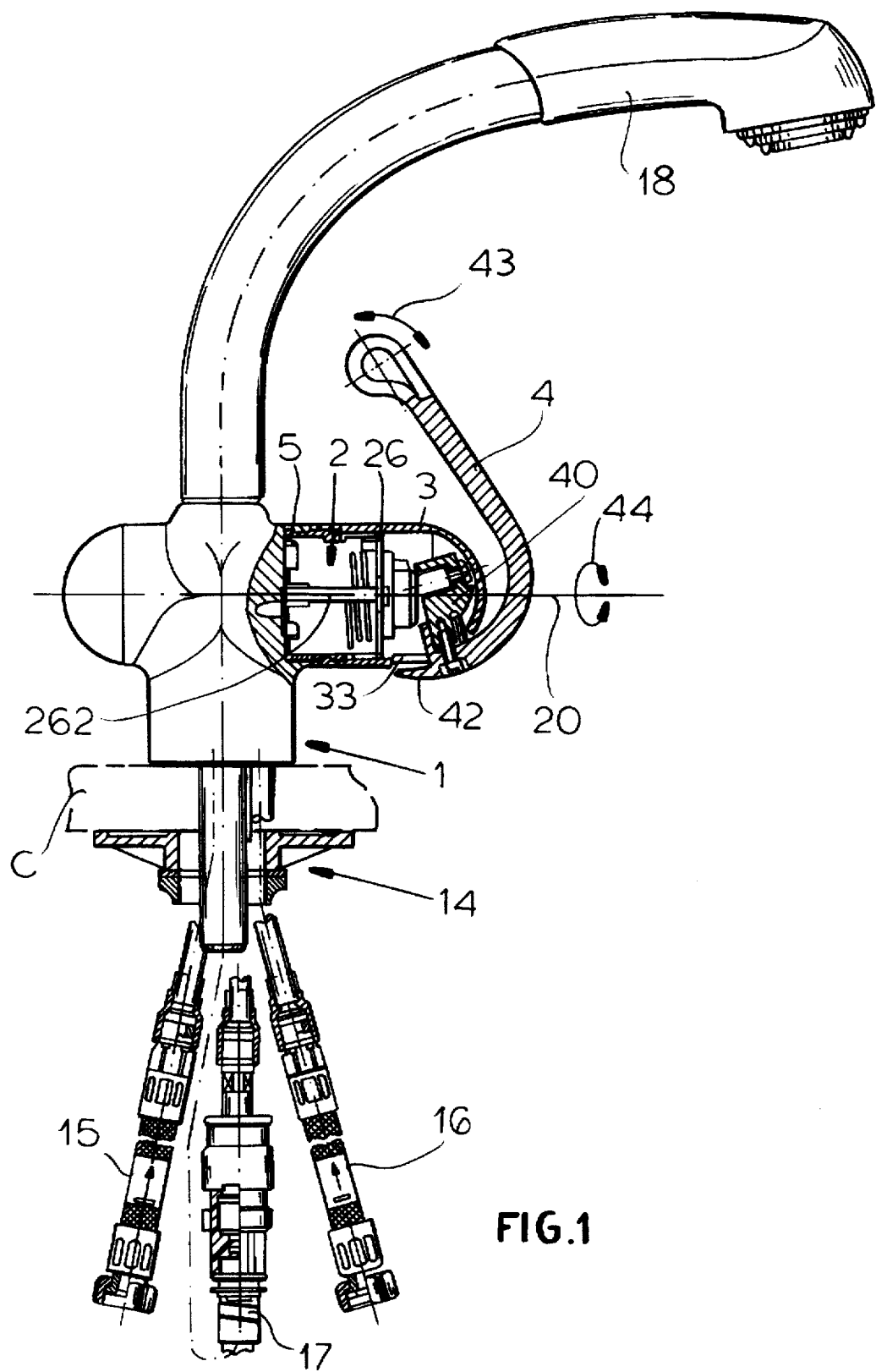
FIG. 1 is a partly sectional small-scale side view of the valve fitting according to the invention.
Figure 2:
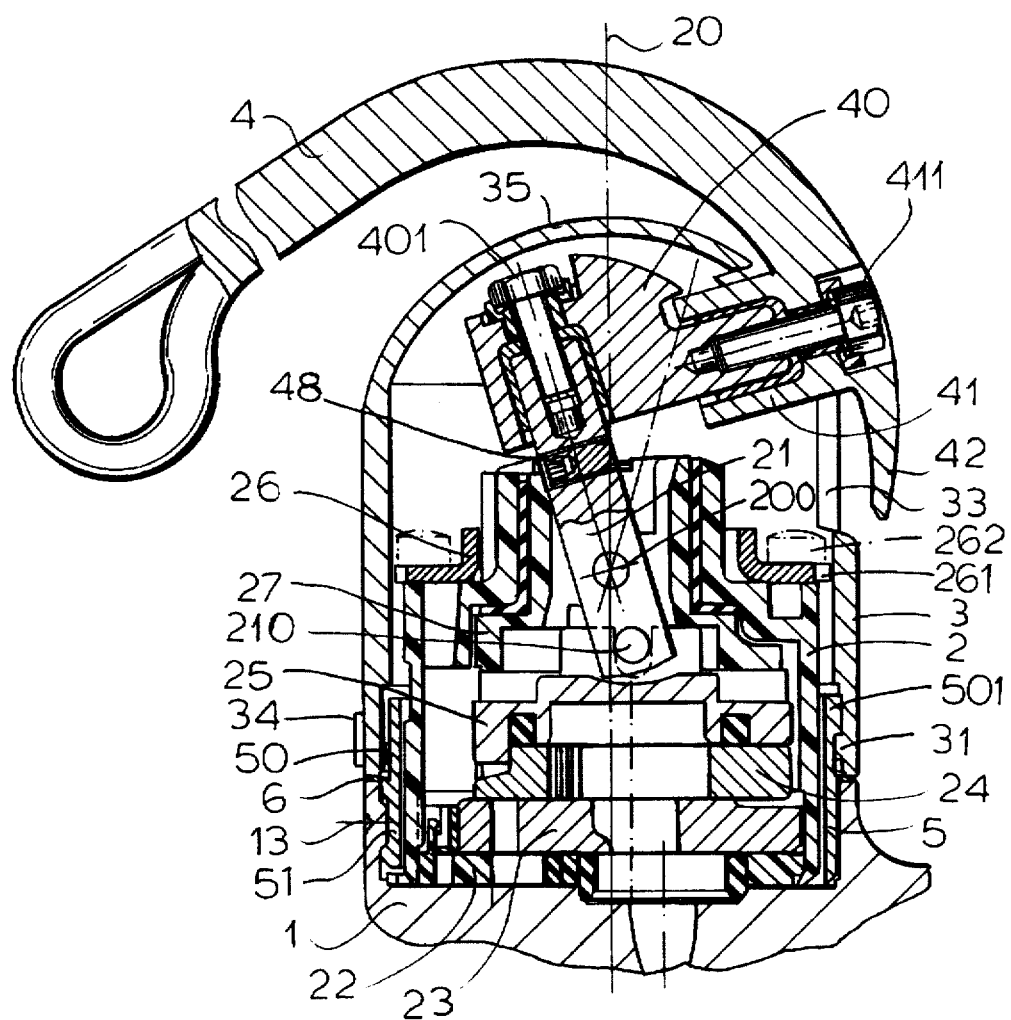
FIG. 2 is a larger-scale section through the valve assembly of the fitting of FIG. 1.

As seen in FIGS. 1 and 2 a mixing-valve/faucet fitting according to the invention has a support or base I formed with a basically cylindrical recess or seat 11 centered on a normally upright axis 1. This base I is normally secured to a horizontal counter shown schematically at C by a nut arrangement 14. Hot- and cold-water supply lines 15 and 16 and a mixed-water hose 17 pass through the counter C and the nut 14. The hose 17 extends back up through the housing 1 to a removable sprayer-type faucet end 18 of the fitting.

Internally the housing 1 holds a standard valve cartridge 2 having a base plate 22 formed with three ports communicating with the lines 15 through 17. Sitting stationarily atop this plate 22 is a ceramic valve plate 23 also formed with three throughgoing holes, and atop this is a movable ceramic valve plate 24 formed with a throughgoing hole and capped by an end plate 25.

A sleeve 27 mounted in the upper part of the cartridge 2 is provided with a central crosswise pivot 200 on which is carried an actuating lever 21 whose lower end is pivoted at 210 on the upper plate 25 and whose upper end is secured by a screw 401 to one leg of an L-shaped fitting 40 whose other leg extends perpendicular to the lever 21 and is secured in turn by a screw 411 to a collar 41 of a c-shaped actuating lever or handle 4. As is standard, rocking the handle 4 as indicated by arrow 43 about the axis 200 changes the volume of flow from the feed lines 15 and 16 to the output conduit 17 by sliding the plates 25 and 24 diametrally of the axis 20 on the plate 23. Pivoting the handle 4 as indicated by arrow 44 about the axis 20 changes the ratio of hot to cold water, thereby varying the temperature of the water in the output conduit 17. A set screw 48 in the lever 21 can be adjusted to limit rearward travel of the lever 21, thereby limiting the maximum flow through the valve. A hold-down ring 26 sitting atop the cartridge 2 is secured by screws 262 (shown 90° offset from their actual positions in FIG. 2) to the housing 1 to fix the cartridge 2 in place in the housing 1.

Figure 5:
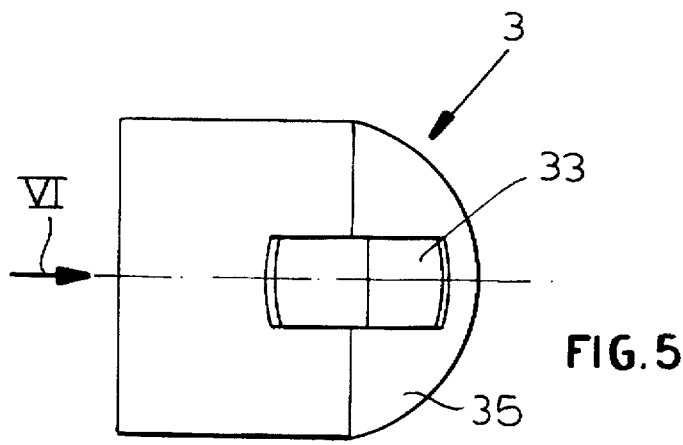
FIG. 5 is a side view of the casing.
Figure 6:
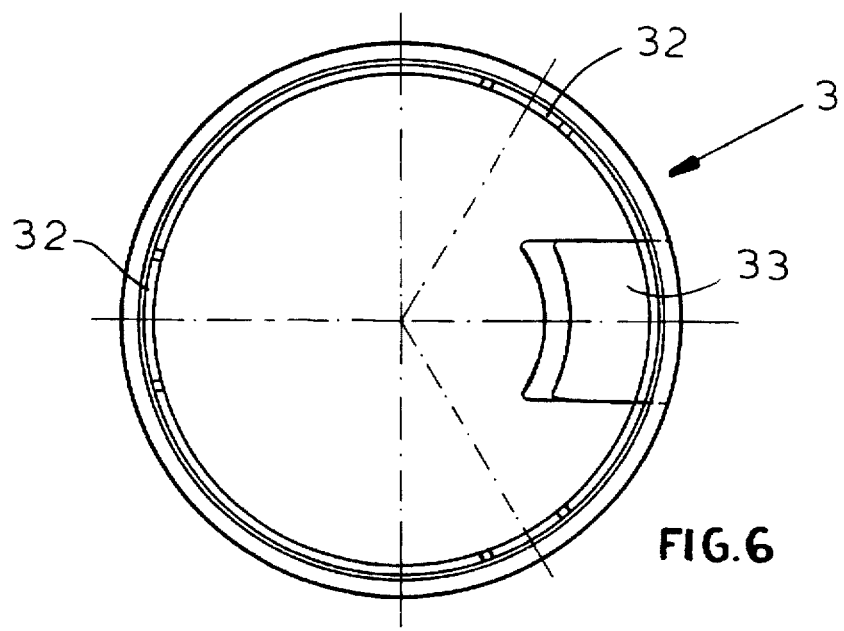
FIG. 6 is a larger-scale end view of the casing taken in the direction of arrow VI of FIG. 5.
Figure 4:
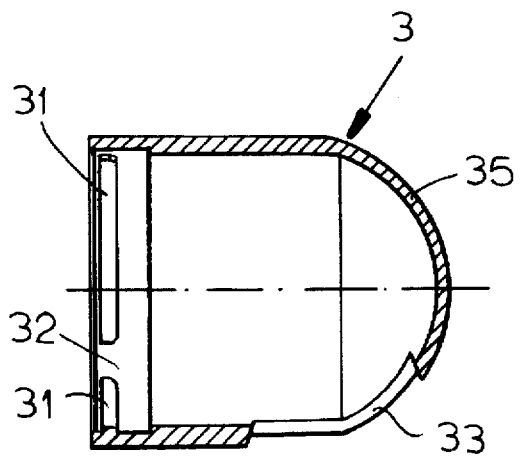
FIG. 4 is a small-scale axial section through the casing of the fitting.
Figure 8:
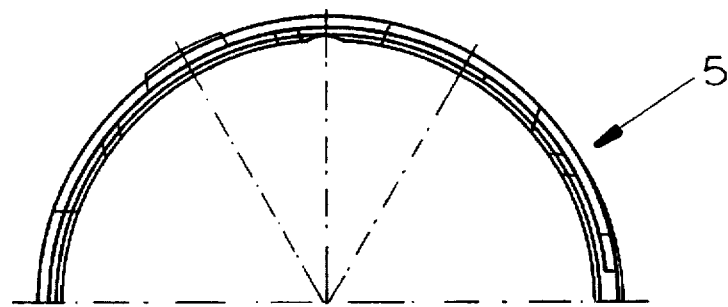
FIGS. 8 and 9 are partial end views of the collar of FIG. 7.
Figure 7:
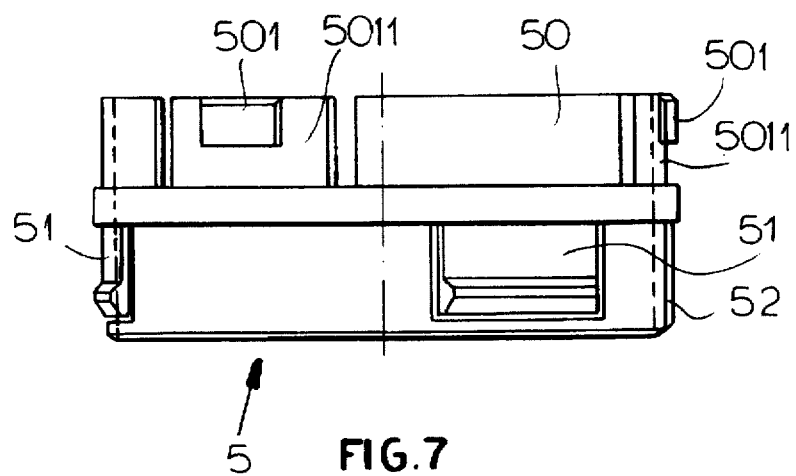
FIG. 7 is a side view of the holding collar of the fitting.
Figure 9:
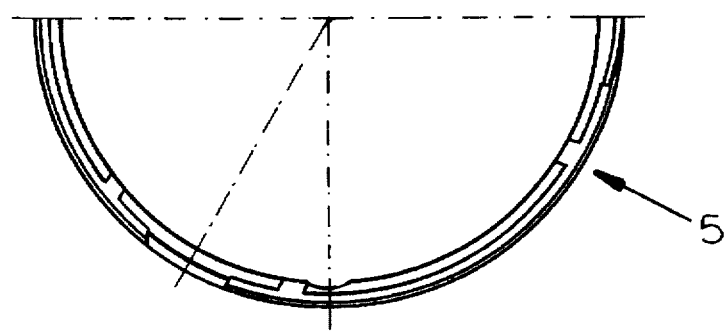

A one-piece cup-shaped casing 3 (FIGS. 4 through 6) fits over the cartridge 2 and is formed with a hemispherical domed top 35 and a rectangular slot 33 through which the collar 41 of the handle 4 extends. A skirt 42 of the handle 4 covers this window or slot 33 even when the handle 4 is tipped all the way back a shown in FIG. 2. A retaining collar 5 (FIGS. 7 through 9) seated in the housing 1 retains this casing 3 in place while permitting it to rotate about the axis 20. The basically rectangular window 3 has a transverse width just wide enough to pass the collar 41 but long enough to accommodate the pivoting about the axis 200 of the handle 4. This casing carries indicia 34 alignable with a mark 13 on the support 11 to indicate the temperature of the water being outputted by the fitting. A seal ring 6 is provided between the planar lower edge of the casing 3 and a complementary upper edge 12 of the housing 1.

Figure 3:
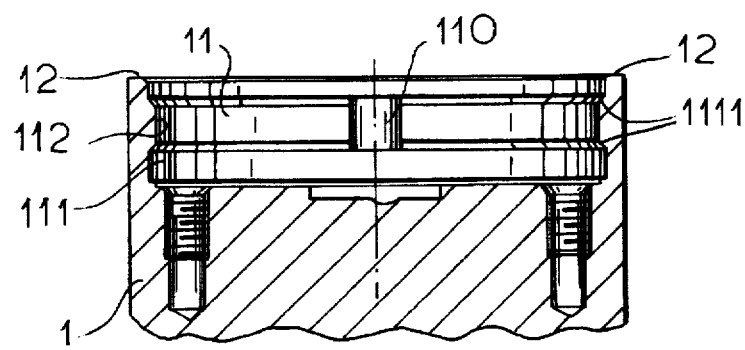
FIG. 3 is a section through a detail of FIG. 2 but taken at 90° to the FIG. 2 section.

As shown in FIG. 3 the housing I is formed in the cylindrical seat 11 with a radially inwardly open groove 111 defining an inwardly projecting ridge 112 formed in turn with an axially extending notch 110. Edges of the ridge 112 are chamfered at 45° at 1111. The collar 5 (FIGS. 7 through 9) is provided with integral downwardly extending fingers or tabs 51 that are radially inwardly deflectable to fit into the groove 11 and with a radially outwardly projecting tab 52 adapted to pass through the notch 110. Thus this collar 5 can be pushed down into the seat 11 where the tabs 51 will lock it in place axially while the tab 52 will fix it rotationally. The inside dimensions of the collar 5 just accommodate the outside dimension of the valve cartridge 2 so that once this cartridge 2 is set in the collar 5 the fingers 51 cannot be deflected back inward sufficiently to allow removal of the collar 5 from the housing 1.

An upper end portion 50 of the collar 5 is formed with three angularly irregularly spaced radially projecting tabs 501 mounted on respective axially extending fingers 5011 so they can be inwardly deflected like the tabs 51. The casing 3 (FIGS. 4 through 6) is formed with three angularly extending and radially inwardly projecting ridges 31 separated by gaps or spaces 32 themselves spaced angularly like the tabs 501. Thus the casing 3 can be slipped axially down over the collar 5 in a position that is 180° reversed from its use position with the window 33 aligned with the horizontal leg of the fitting 40. Once all the way down in position, the casing 3 can be rotated 180° to align the window 33 with the fitting 40 and allow the handle 4 to be mounted on the fitting 40. The retaining ring 26 is formed with radial projections 261 that engage the cylindrical inner surface of the casing to keep it centered on the axis 20.

We claim:

1. A mixing valve comprising:

a housing;

a valve cartridge fixed in the housing and having valve elements movable to vary rate and temperature of flow through the cartridge;

a handle connected to the valve elements and movable through a predetermined angular displacement about a temperature-adjustment axis to vary the temperature of flow through the cartridge and a flow-adjustment axis orthogonal to the temperature-adjustment axis to vary the rate of flow through the cartridge;

a sleeve-like casing surrounding the cartridge, rotatable on the housing about one of the axes, and traversed by the handle; and means including interengaging formations on the casing and on the housing for axially retaining the casing on the housing except in a predetermined angular position of the casing on the housing relative to the one axis, the predetermined angular position corresponding to an orientation of the casing on the housing outside any position assumed by the casing during pivoting of the handle through the predetermined angular displacement about the one axis, whereby the casing can be installed on the housing in the predetermined angular position and then rotated out of the predetermined angular position to lock it axially on the housing.

2. The mixing valve defined in claim 1 wherein the formations include radially outwardly projecting nonequiangularly spaced projections on the housing and radially inwardly projecting ridges defining gaps complementary to and angularly spaced like the projections, whereby when axially aligned the projections can pass through the gaps, the casing being formed with a radially throughgoing window through which the handle extends.

3. The mixing valve defined in claim 2 wherein the cartridge is provided with a radially directed mount for the handle and the window is so positioned that, when the projections are axially aligned with the respective gaps the window is offset relative to the one axis, the mount is offset relative to the one axis by about 180° to the window.

4. The mixing valve defined in claim 2 wherein the housing includes a collar formed with the projections.

5. The mixing valve defined in claim 4 wherein the housing is formed with a seat receiving the collar and centered on the one axis, the seat and collar being formed with a radially interengaging ridge and groove that rotationally link the collar and housing against rotation about the one axis, the collar being formed with radially deflectable tabs engaging in the seat and retaining the collar therein against axial movement.

6. The mixing valve defined in claim 5 wherein the seat is formed with a groove in which the tabs engage and the tabs and groove have chamfered edges, the collar and housing having annular surfaces that flatly engage each other when the collar is fitted to the seat.

7. The mixing valve defined in claim 6 wherein the cartridge has a cylindrical outer surface engaging inner surfaces of the tabs and preventing inward deflection of same when the cartridge is in the collar.

8. The mixing valve defined in claim 4 wherein the collar is formed with radially inwardly deflectable tongues carrying the projections.

9. The mixing valve defined in claim 4 wherein the collar has three such projections and the projections are formed of a low-friction material and are rounded.

10. The mixing valve defined in claim 2 wherein the window and the handle each have a dimension measured transversely of the one axis that are roughly equal to each other, whereby the handle entrains the casing when pivoted about the one axis.

11. The mixing valve defined in claim 10 wherein the handle has a dimension measured parallel to the one axis and the window has a correspondingly measured dimension that is much greater so that when pivoted about the other axis the casing is not entrained, the handle carrying a skirt that covers the window in all positions.

12. The mixing valve defined in claim 1 wherein the housing and casing have adjacent indicia indicating relative positions.

13. The mixing valve defined in claim 1, further comprising a seal ring between the housing and casing.

14. The mixing valve defined in claim 1, further comprising means including a hold-down ring and screws clamping the cartridge onto the housing, the cartridge being formed with external guides for the casing.

15. The mixing valve defined in claim 1 wherein the casing is of one piece and is cup-shaped with a domed closed end.

* * * * *